M. H. EAST.
HARVESTING MACHINE.
APPLICATION FILED JUNE 12, 1912.
1,150,104.
Patented Aug. 17, 1915.
6 SHEETS—SHEET 1.
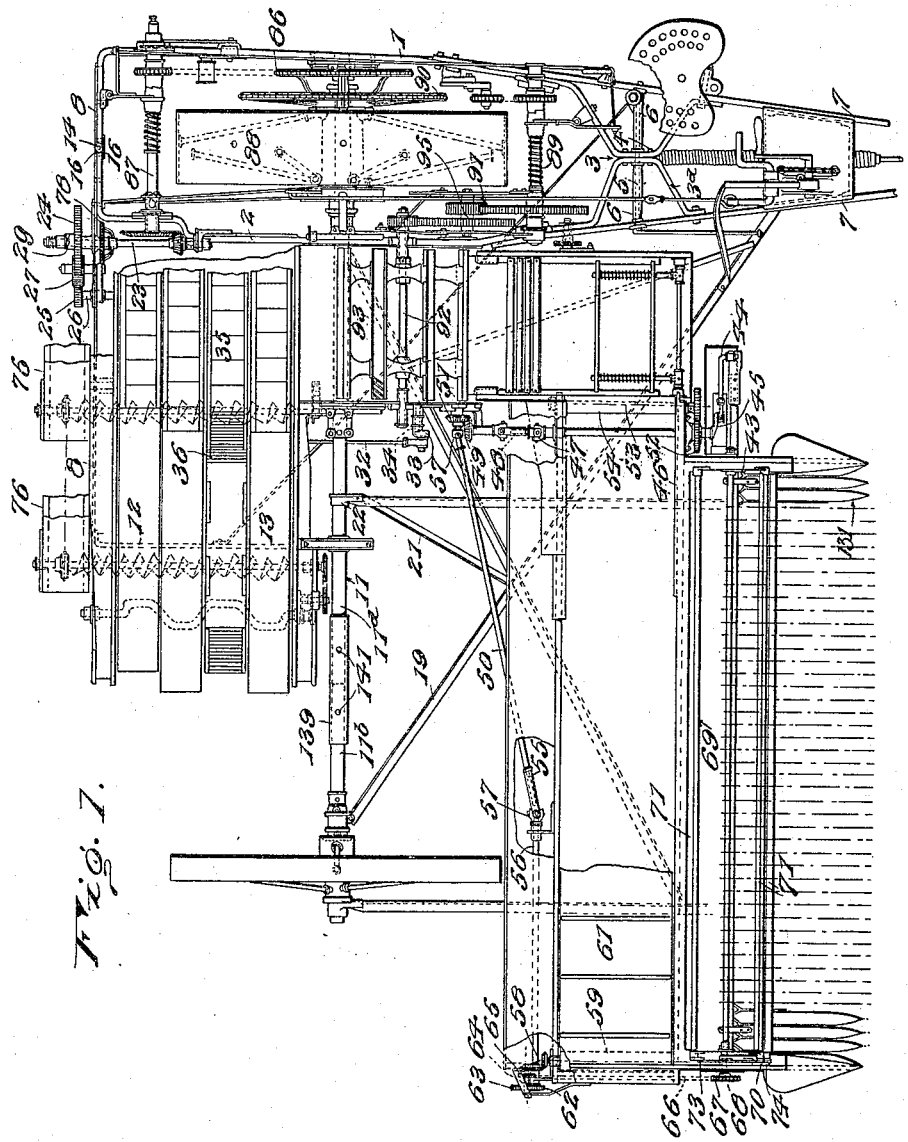
Witnesses
W. A. Williams
H. L. Mirie
Inventor
Matthew Henry East
By J. Edward Maybee
Attorney

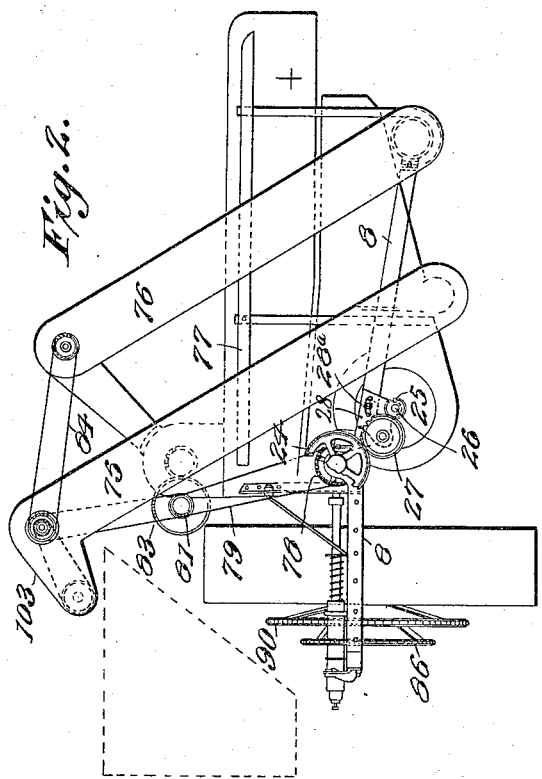

M. H. EAST.
HARVESTING MACHINE.
APPLICATION FILED JUNE 12, 1912.
1,150,104.
Patented Aug. 17, 1915.
6 SHEETS—SHEET 3.
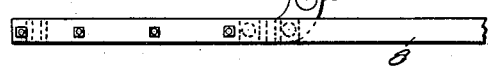
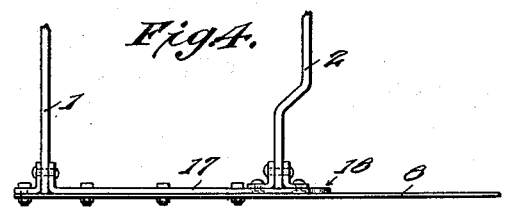
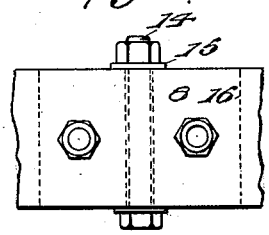 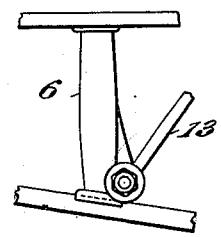
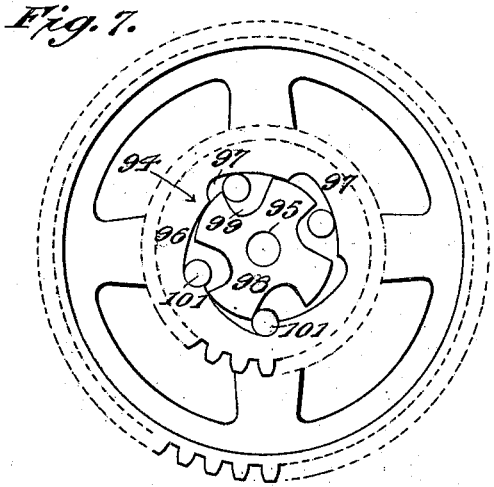
Witnesses
W. A. Williams
H. L. Minie.
Inventor
Matthew Henry East
By J. Edward Maybee
Attorney M. H. EAST.
HARVESTING MACHINE.
APPLICATION FILED JUNE 12, 1912.
1,150,104.
Patented Aug. 17, 1915.
6 SHEETS—SHEET 4.
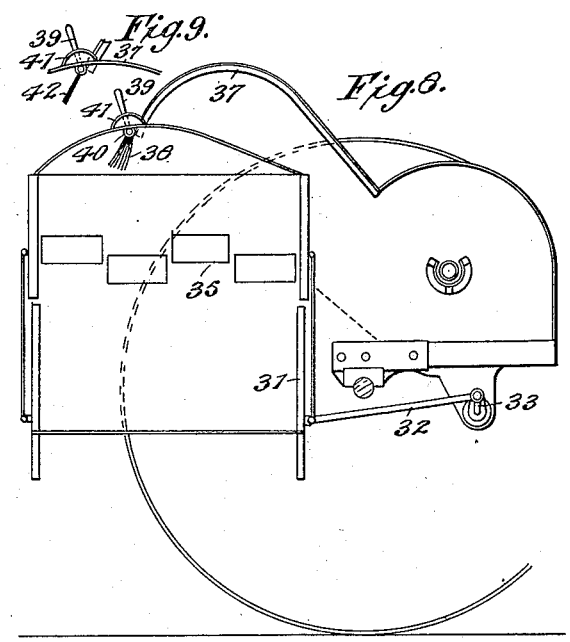
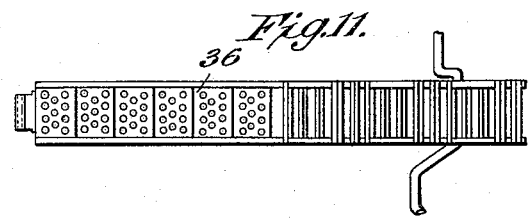

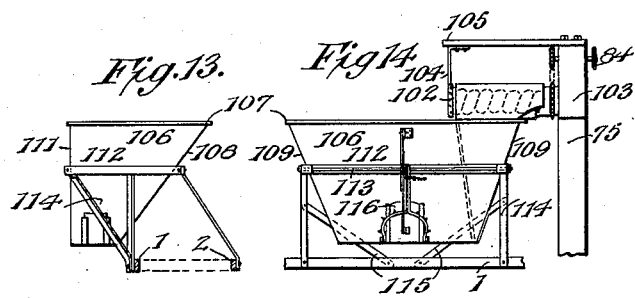
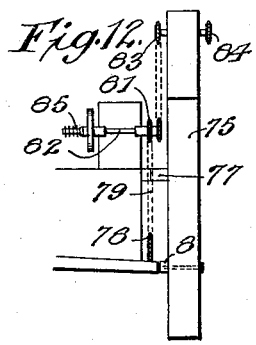
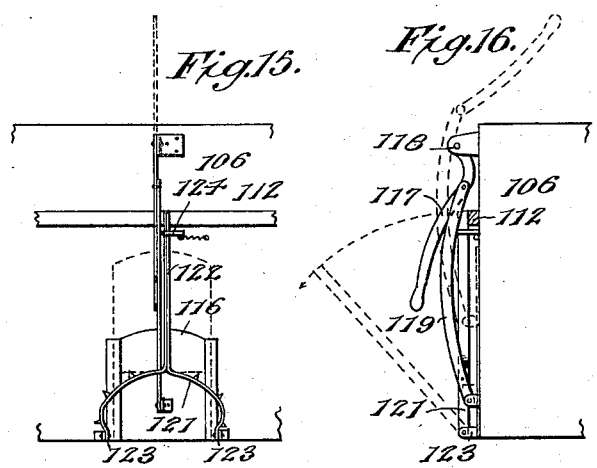

M. H. EAST.
HARVESTING MACHINE.
APPLICATION FILED JUNE 12, 1912.
1,150,104.
Patented Aug. 17, 1915.
6 SHEETS—SHEET 6.
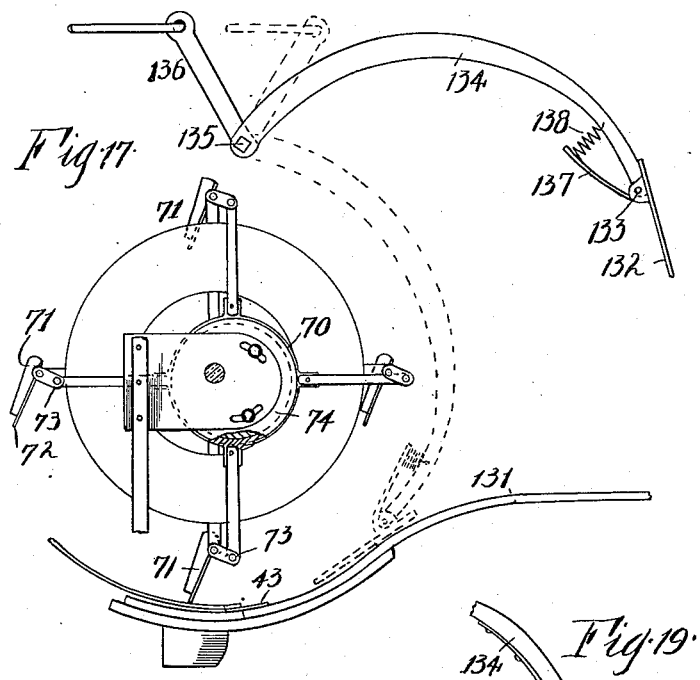
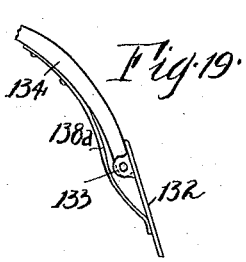
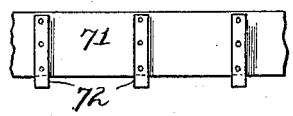
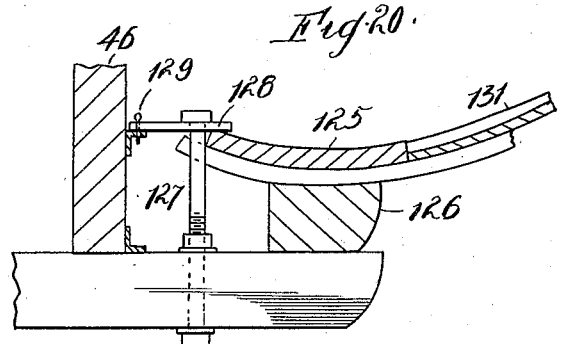
Witnesses
W. A. Williams
Inventor
Matthew Henry East.
By J. Edward Maybee
Attorney

UNITED STATES PATENT OFFICE.

MATTHEW HENRY EAST, OF MELBOURNE, VICTORIA, AUSTRALIA, ASSIGNOR TO MASSEY-HARRIS COMPANY, LIMITED, OF TORONTO, CANADA.

HARVESTING-MACHINE.

1,150,104.  Specification of Letters Patent.  Patented Aug. 17, 1915.

Application filed June 12, 1912. Serial No. 703,272.

*To all whom it may concern:*

Be it known that I, MATTHEW HENRY EAST, of Melbourne, State of Victoria, Australia, have invented certain new and useful Improvements in Harvesting-Machines Particularly Applicable to Reapers and Threshers, of which the following is a specification.

This invention consists of certain improvements in harvesting machines which are particularly applicable to combined reapers and threshers.

The invention is illustrated by the accompanying drawings, whereof—

Figure 1 is a plan of the machine with parts omitted, such parts being illustrated by detail drawings referred to hereinafter. Fig. 2 is a rear elevation of part of the machine. Figs. 3 and 4 are detail views of parts of Figs. 1 and 2. Fig. 5 is a detail of a modification of the structure shown in Figs. 3 and 4. Fig. 6 is a detail in plan of the connection between the parts of the frame passing rearwardly on each side of the main wheel. Fig. 7 is a detail of the threshing drum. Fig. 8 is an end elevation partly in section showing the straw bumpers or walkers and shoe, and Fig. 9 is a detail of a modification of part of Fig. 8. Figs. 10 and 11 are enlarged details of the straw bumpers or walkers. Fig. 12 is a side elevation of the grain elevator and cavings drum illustrating the gearing shown also in Fig. 2. Figs. 13 and 14 are respectively end and side views of the grain box, and Figs. 15 and 16 are enlarged views of the bag holding device. Fig. 17 is an end elevation of the reel illustrating the construction shown in Fig. 1, and the choke cutter not shown in said figure, and Fig. 18 a fragmentary detail of the reel blade. Fig. 19 is a detail illustrating a modification of the construction of the choke cutter. Fig. 20 is an enlarged section through the comb or cutter bar illustrating the means of adjustment.

According to this invention the frame around the main wheel is made in two pieces 1, 2, bent inwardly toward each other at the front as at 3, and joined by means of bolts or rivets 4 and by a bolt 5 extending through thimbles 6, Figs. 1 and 6, connecting the fore-carriage bars 7, and then bent outwardly as at 3$^a$, and secured to said bars, as shown in Fig. 1. The rear ends are bent toward each other and bolted to a sill or bar 8 upon which the winnowing mechanism is supported, and which extends from the outer corner across the back of the machine and is bent longitudinally, to the main axle 11, or joined by a longitudinal bar 12 to said main axle and braced by a diagonal bar 13, extending from the fore-carriage bar 7 or one of the thimbles 6 thereon as in Figs. 1 and 6. The rear ends of the frame around the main wheel come close together and a bolt 14, with washers 15 top and bottom, is passed between same while they are also connected by a plate 16 on the inside as in Figs. 1 and 5, the object being to form a rigid connection and prevent the frame from twisting. If desired, the rear ends may be joined to a transverse bar 17 fixed to the sill 8, said bar being adapted to be upturned as at 18, Figs. 3 and 4, to support the main drive shaft at the rear of the machine.

The diagonal frame 19 supporting the reaping parts of the machine is made more rigid by means of a brace 21 attached to same and to a bracket 22 on the main axle.

Upon the rear longitudinal drive shaft 23 is a toothed wheel 24 gearing with a pinion 25 on the fan shaft 26 by means of an intermediate toothed wheel 27 mounted on a bracket 28 pivoted on the same center as the pinion and secured by means of the bolt and slot connection 28$^a$, Fig. 2, so that a direct drive is obtained and different sized gears 24 to vary the speed may be used as required by angularly adjusting the bracket. In addition a clutch 29 is provided on this rear drive shaft to permit the fan to revolve after the rest of the machinery has stopped.

The shoe 31 is driven by a pitman 32 passed under the main axle and connected to the lower part of said shoe and to an eccentric or crank 33 on a counter shaft 34, Figs. 1 and 8. By thus connecting the drive gear of the shoe to its heaviest part the shoe will stand a great amount of jarring without injurious effect.

The straw walkers or bumpers 35, Figs. 1 and 8, of the winnowing part of the machine are formed with a stepped and perforated surface 36, Figs. 10 and 11, at their receiving end whereby the advancement of the straw is facilitated, and the grain more readily freed therefrom.

The casing of the straw walkers or bumpers is provided above the receiving end of the latter with a raised dome-shaped deflector 37, Fig. 8, to insure the grain etc. being well distributed upon the walkers and prevent it stacking on the outer side.

About the rear end of the dome-shaped deflector there is suspended a stationary or rockable adjustable screen formed of a row or rows of wire rods 38, Fig. 8, which permits the grain thrown from the threshing drum to pass through but which retards the straw and prevents same from being thrown across to the outer side of the walkers. The shaft 40 of the screen is provided with a spring toothed lever 39 engaging a quadrant 41 for adjusting said screen. If desired a stationary or rockable apron 42 may be substituted for the adjustable screen above described, as illustrated in Fig. 9.

The reciprocating sickle knife 43, Fig. 1, of the reaping mechanism is driven by a pitman 44, through the medium of a crank shaft 45 mounted on the conveyer frame 46 and connected by universal joints 47 and a telescopic connection 48 driven by bevel gear wheels 49, 51. By means of this construction the crank shaft 45 is independent of the comb bar and so the drive gear of the knife is not affected by the adjustment of said comb bar. The crank shaft 45 is geared directly by spur gearing 52 with the spindle 53, of the inner conveyer roller 54.

From the end of the shaft on which bevel gear wheel 51 is mounted a diagonal shaft 50 is telescopically connected as at 55 to a short transverse shaft 56 on the outer rear end of the transverse conveyer frame by means of universal or knuckle joints 57 and bevel gearing 58 from this transverse shaft drives the outer roller 59 of the conveyer 61. At the outer end of said shaft 56 is a pinion 62 gearing with a pinion 63 on a short counter shaft 64 provided with a sprocket 65 which by means of a chain 66 and another sprocket 67 drives the spindle 68 of the reel 69.

The blades 71 of the reel are adjustable and maintained in a set inclination either vertical or otherwise throughout the revolution of the reel by means of cranks 73 operated through the medium of eccentrics 70 loosely but adjustably mounted on grooved collars 74 on the reel spindle as illustrated in Figs. 1 and 17. The blades 71 may be provided with teeth 72, Figs. 17 and 18, to convey the incoming crop over the teeth without forcing any portion between same.

The grain and cavings elevators 75, 76 are secured to the outside of the rear transverse sill 8, and to a bolster 77 above, Figs. 2 and 12, by means of which room is provided between the elevators and the winnower for most of the drive gear. This gear consists of a sprocket 78 on the rear drive shaft 23 driving by means of a chain 79 a sprocket 81 on the cavings thresher shaft 82 and from this shaft, by means of sprocket gearing 83, the grain elevator 75 is driven while by means of sprocket gearing 84 the cavings elevator 76 is driven. A clutch 85 is provided on the cavings thresher shaft 82 to permit the thresher to revolve after its shaft 82 is at rest.

The main sprockets for the front and rear drive, Fig. 1, are arranged on the outside of the main wheel 88 of the machine by which means the strain is more evenly balanced. The rear sprocket 86 drives a rear cross shaft 87, at the rear of the main wheel 88, which drives the rear longitudinal shaft 23, while the front sprocket 90 drives a transverse shaft 89 in front of the main wheel. From this shaft by means of compound intermediate spur gearing 91 the spindle 92 of the threshing drum 93 is driven and a clutch 94 is employed on any of these shafts to allow the drum to rotate after the machine is stopped.

The clutch is preferably provided on the intermediate shaft 95 or the drum spindle 92 and is of special construction as illustrated in Fig. 7. The outer box portion of one gear wheel contains a chamber 96 formed with a number of seatings 97 such as five, and the center 98 of the clutch is formed with a number of recesses 99, such as four, and a similar number of rollers 101, such as four are provided. By this construction only one roller comes into engagement with a seating at a time and the clutch acts very quickly.

The rotary conveyer screen 102 on the stationary grain spout 103, Fig. 14, of the grain elevator 75 is supported at its outer end on a hanger or bracket 104 secured to the outer end of an arm 105 extending from said elevator.

The grain box 106 is of especial shape so that in shipping or packing qualities they may, when the tops 107 and internal partitions are removed, be nested and so occupy a minimum of space. Accordingly the inner side 108 and ends 109 are inclined toward the bottom while the outer side 111 is vertical, as illustrated in Figs. 13 and 14. The grain box is dropped into and seated in a rectangular frame 112 braced by the rods 113 and supported by suitable brackets 114 and braces 115 from the frame pieces 1, 2.

The slide door 116 of the grain box is kept in raised or lowered position by means of a lever 117, Figs. 15 and 16, pivoted as at 118 at the upper end to the box and provided with a link arm 119 connected to said door. By moving this lever up as indicated in dotted lines so that the link arm passes over the dead center the door is locked in its raised position, while by lowering said lever the door is locked in its lowered position.

The bagholder comprises a spiked yoke 121 on the lower end of a handle 122 and the forks of the yoke are pivoted at their lower ends to lugs 123 about the bottom edge of the box while the handle is secured when the bag holder is not required by a spring-controlled catch 124.

The comb or cutter bar 125, Fig. 20, is supported upon a transverse bar 126 and adapted to be tilted by means of adjusting bolts 127. These bolts are connected with short arms 128 which are pivoted as at 129 on the conveyer frame 46 and bear upon the rear edge of the bar 125. By tightening or loosening the bolts 127 the comb or cutter bar and the comb teeth 131 may thus be raised or lowered.

A simplified choke cutter or chopper is provided for the comb, which is separately illustrated in Fig. 17. It consists of a knife 132 pivoted as at 133 to the outer ends of curved arms 134 mounted on a rockshaft 135 operated through the medium of a lever 136. On the back of the knife there are short arms or lugs 137 extending underneath the arms and compression springs 138 are connected to said lugs and underside of said arms which permit the knife to slide along the comb teeth close to the sickle knife 43. By this construction the arm guards the spring and prevents same becoming tangled in the crop.

If preferred the arms or lugs 137 may be dispensed with in which case flat springs 138ª are provided on the underside of arms 134 and bear against the underside of the knife as illustrated in Fig. 19.

The main axle may be made in two lengths 11ª, 11ᵇ, Fig. 1, joined by a sleeve 139 secured by pins 141, so that one length may be removed to reduce the width of the machine for the purpose of transport.

What I claim as my invention is:

1. In harvesting machines such as reapers and threshers, a frame in which the main wheel is mounted made in two pieces bent inwardly at the front and then forwardly to contact with each other side by side and joined together, and bent inwardly toward each other at the rear and secured together end to end.

2. In harvesting machines such as reapers and threshers, fore-carriage bars; winnowing mechanism; a transverse sill upon which the winnowing mechanism is supported; and a frame in which the main wheel is mounted made in two pieces bent inwardly toward each other at the front and joined and then bent outwardly and attached to the fore-carriage bars, and bent toward each other at the rear and bolted to the transverse sill.

3. In harvesting machines such as reapers and threshers, a transverse sill; a frame for the main wheel made in two pieces bent toward each other at the rear and secured to the transverse sill with their ends close together; a bolt with washers top and bottom between said ends; and a plate on the inside joining the said ends.

4. In harvesting machines such as reapers and threshers, a frame for the main wheel made in two pieces bent toward each other; a transverse bar to which said pieces are connected provided with an upturned end; and a transverse sill to which said bar is connected, said upturned end being adapted to support the main rear longitudinal drive shaft of the machine.

5. In harvesting machines such as reapers and threshers, a main axle; a main wheel frame; a fore-carriage frame in front of the main wheel frame; a transverse fore-carriage bar; and a supporting frame for the winnowing mechanism consisting of a transverse sill secured to the rear of the main wheel frame, a longitudinal bar secured to the transverse sill and the main axle of the machine and a diagonal brace extending from said longitudinal bar to the fore-carriage bar.

6. In harvesting machines such as reapers and threshers, the combination of the main axle; a main wheel frame; a fore-carriage frame in front of the main wheel frame; a bracket on the main axle; a diagonal frame supporting the reaping parts of the machine extending from the main axle to the fore-carriage frame; and a brace connecting the diagonal frame with the bracket on the main axle.

7. In harvesting machines such as reapers and threshers; the combination of a main wheel frame; a main drive wheel provided on its axle with two main sprockets arranged inside the main wheel frame at the outside of said wheel; two transverse transmission shafts journaled on said frame one in front of and one behind the main wheel; sprocket wheels on said shafts for actuating the same; and chains connecting said sprocket wheels with the sprocket wheels of the main wheel.

8. In harvesting machines such as reapers and threshers, a frame in which the main wheel is mounted made in two pieces bent inwardly at the front on a slight angle, then bent inwardly again at an angle, then bent forwardly to contact with each other side by side and then again bent outwardly and bent inwardly toward each other at the rear and secured together end to end, two fore-carriage members each secured to the part of the main frame bent inwardly at a slight angle and to the outer end of one of the outwardly turned ends.

Toronto, this 22 day of May 1912.

MATTHEW HENRY EAST.

Signed in the presence of—
FRED HOWARD McLEAN,
CHAS. JAMES COCKER.

Copies of this patent may be obtained for five cents each, by addressing the "Commissioner of Patents, Washington, D. C."